(12) United States Patent
Asakawa et al.

(10) Patent No.: US 6,862,667 B2
(45) Date of Patent: Mar. 1, 2005

(54) SYNCHRONOUS DRAM UTILIZABLE AS SHARED MEMORY

(75) Inventors: Masashi Asakawa, Kawasaki (JP);
Noriyuki Matsui, Kawasaki (JP);
Yasuo Kousaki, Kawasaki (JP);
Shigeru Takamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/816,236

(22) Filed: Mar. 26, 2001

(65) Prior Publication Data

US 2002/0062428 A1 May 23, 2002

(30) Foreign Application Priority Data

Nov. 22, 2000 (JP) ....................................... 2000-355514

(51) Int. Cl.⁷ .............................................. G06F 12/00
(52) U.S. Cl. ...................... 711/153; 711/105; 711/156
(58) Field of Search ................................ 711/105, 153, 711/156

(56) References Cited

U.S. PATENT DOCUMENTS

| | | | | | |
|---|---|---|---|---|---|
| 5,307,320 | A | * | 4/1994 | Farrer et al. ................. | 711/105 |
| 5,574,876 | A | * | 11/1996 | Uchiyama et al. ............. | 711/5 |
| 6,028,816 | A | | 2/2000 | Takemae et al. ............ | 365/233 |
| 6,092,165 | A | * | 7/2000 | Bolyn ........................ | 711/105 |
| 6,173,356 | B1 | * | 1/2001 | Rao ........................... | 711/5 |
| 6,205,516 | B1 | * | 3/2001 | Usami ........................ | 711/105 |
| 6,401,176 | B1 | * | 6/2002 | Fadavi-Ardekani et al. | 711/149 |

* cited by examiner

Primary Examiner—Matthew Kim
Assistant Examiner—Woo H. Choi
(74) Attorney, Agent, or Firm—Arent Fox

(57) ABSTRACT

A memory array is divided into a plurality of blocks. A plurality of mode storage units is so disposed as to correspond to the memory blocks. When a plurality of controllers outputs a mode setting instruction at the time of making of power, a setting unit 113 sets control information designated by the mode setting instruction to the corresponding mode storage unit. When different controllers gain access to a synchronous DRAM, an access operation is executed for the corresponding memory block in accordance with the control information.

12 Claims, 9 Drawing Sheets

Fig.5A

| A9 | A8 | A7 | A6 | A5 | A4 | A3 | A2 | A1 | A0 |
|----|----|----|----|----|----|----|----|----|----|
| WBL | TEST MODE || CAS LATENCY ||| BT | BURST LENGTH |||

WBL: WRITE BURST LENGTH
BT: BURST TYPE

Fig.5D

TEST MODE

| A8 | A7 | |
|----|----|----|
| 0 | 0 | OPERATION MODE SETTING |
| 0 | 1 | SPARE |
| 1 | 0 | SPARE |
| 1 | 1 | SPARE |

Fig.5C

CAS LATENCY

| A6 | A5 | A4 | |
|----|----|----|----|
| 0 | 0 | 0 | SPARE |
| 0 | 0 | 1 | 2 |
| 0 | 1 | 0 | 3 |
| 0 | 1 | 1 | SPARE |
| ⋮ | ⋮ | ⋮ | ⋮ |
| 1 | 1 | 1 | SPARE |

Fig.5B

BUST LENGTH

| A2 | A1 | A0 | BT=0 | BT=1 |
|----|----|----|------|------|
| 0 | 0 | 0 | 1 | 1 |
| 0 | 0 | 1 | 2 | 2 |
| 0 | 1 | 0 | 4 | 4 |
| 0 | 1 | 1 | 8 | 8 |
| 1 | 0 | 0 | SPARE | SPARE |
| ⋮ | ⋮ | ⋮ | ⋮ | ⋮ |
| 1 | 1 | 1 | FULL BURST | SPARE |

Fig.5E

| A9 | WBL |
|----|-----|
| 0 | BURST |
| 1 | SINGLE BIT |
| A3 | BT |
| 0 | SEQUENTIAL |
| 1 | INTERLEAVE |

Fig.9

| A9 | A8 | A7 | A6 | A5 | A4 | A3 | A2 | A1 | A0 |
|----|----|----|----|----|----|----|----|----|----|
| WBL | TEST MODE | | CAS LATENCY | | | BT | BURST LENGTH | | |

WBL: WRITE BURST LENGTH
BT: BURST TYPE

TEST MODE

| A8 | A7 | |
|----|----|---|
| 0 | 0 | OPERATION MODE SETTING (1) |
| 0 | 1 | OPERATION MODE SETTING (2) |
| 1 | 0 | OPERATION MODE SETTING (3) |
| 1 | 1 | OPERATION MODE SETTING (4) |

SYNCHRONOUS DRAM UTILIZABLE AS SHARED MEMORY

BACKGROUND OF THE INVENTION

1. Field of the Invention

This invention relates to a synchronous DRAM capable of continuously reading/writing data stored in a plurality of memory cells by a single read/write operation.

2. Description of the Related Art

A synchronous DRAM (Dynamic Random Access Memory) has a feature that it can continuously read and write at a high speed data having a desired length. Because of this feature, the synchronous DRAM has been used mainly as a storage device for storing data that are continuously read/written, such as image data. Recently, the capacity of the synchronous DRAM has been increased, too, and devices having a capacity greater than the capacity required for an image memory have been developed.

A memory system utilizing the conventional synchronous DRAM will be explained with reference to FIG. 1. Burst length and CAS latency are set as data for defining an operation mode of a synchronous DRAM 401 to a mode register set 411 provided to the synchronous DRAM 401. This setting is executed at the time of making of power. The burst length is used for controlling an address generation process by an input control circuit 412. CAS latency is used for executing delay control in a data output processing by an output control circuit 413.

When a controller 402 outputs a control signal designating a read operation with an address A0 to a bus, the input control circuit 412 outputs a control signal designating a data read operation to a memory array 415. At the same time, addresses of a length corresponding to the burst length are generated with the address A0 as the leading address, and are serially inputted to an address decoder 414. The content of corresponding memory cells is serially read out from the memory array 415 in accordance with the decoding result obtained by the address decoder 414 and are outputted to the bus through the output control circuit 413.

On the other hand, when the address AN is inputted with the control signal designating the write operation, the input control circuit 412 outputs the control signal designating the data write operation to the memory array 415. Continuous addresses of a length corresponding to the burst length are generated with the address AN as the leading address, and are serially inputted to the address decoder 414. The data inputted to the input control circuit 412 through the data bus are serially written to the memory cells designated by the decoding result obtained by the address decoder 414.

Setting of the operation mode to the conventional synchronous DRAM 401 is conducted in the following procedure.

1. First, the controller 402 generates a control signal for bringing the synchronous DRAM 401 into an idle mode, and inputs this signal to the synchronous DRAM.

2. The controller 402 then inputs a predetermined address signal to the synchronous DRAM 401 and sets the mode register set 411.

3. After the operation mode to the mode register set is thus completed, the controller 402 inputs a control signal representing an active command to the synchronous DRAM 401. In consequence, the synchronous DRAM 401 shifts to a readable active condition.

In the application of the conventional synchronous DRAM, the read and write operations are executed ordinarily in accordance with the operation mode set in the way described above at the time of turning-on power.

Because synchronous DRAMs having a large capacity have now been developed, the application of such synchronous DRAMs to the application of a shared memory that is accessed in common by a plurality of controllers has been expected. For example, utilization of one synchronous DRAM not only as the image memory but also as program storage is expected.

However, the conventional synchronous DRAM is fabricated on the assumption that the memory is accessed as a whole by a single controller. Therefore, setting of the burst length and CAS latency has been made for the synchronous DRAM as a whole.

When image data corresponding to a plurality of cells are continuously read out from a part of the memory array of the synchronous DRAM, therefore, the burst length and CAS latency suitable for such image data must be set beforehand to the mode register set. When an access is made to the program data, the burst length and CAS latency suitable for the program data must be set once again to the mode register set, too. To change setting of the mode register set, the controller must execute the operations of the three stages of 1 to 3 described above.

As described above, when a plurality of controllers gains access to the synchronous DRAM in different operation modes, setting of the operation mode must be changed frequently, and performance of the overall processing drops remarkably due to this setting processing.

On the other hand, if the operation mode for the read/write operation directed to a single memory cell is set in the same way as in the case of the ordinary memory, a plurality of controllers can gain access in common. In this case, however, the operation mode for executing the read/write operation directed to the single memory cell is applied to the image data for which the operation mode for continuously reading long data is effective, and high-speed performance expected of the utilization of the synchronous DRAM cannot be exploited.

SUMMARY OF THE INVENTION

It is an object of the present invention to provide a synchronous DRAM that can be shared by a plurality of controllers while the feature of the synchronous DRAM is exploited.

The present invention aims at accomplishing this object.

In the synchronous DRAM according to the present invention, a memory array is divided into a plurality of memory blocks. The memory blocks can be formed by logically dividing the memory array into continuous regions that continue in an address space. The memory blocks can be brought into conformity with memory banks as a unit of a refresh operation. The synchronous DRAM includes a plurality of mode storage units corresponding respectively to each memory block.

When a plurality of controllers outputs a mode setting instruction at the time of making of power, or the like, a setting unit in the synchronous DRAM sets control information designated by the mode setting instruction into a corresponding mode storage unit.

When each controller gains access to the synchronous DRAM, a mode selection unit in the synchronous DRAM hands over the control information stored in the corresponding mode storage unit to an access unit. The access unit executes an access operation in synchronism with a predetermined clock signal for the corresponding memory block in accordance with the control information.

According to the present invention, each memory block is allowed to independently operate in the operation mode represented by the control information stored in the corresponding mode storage unit. Therefore, the present invention enables a plurality of controllers requiring different operation modes to share the synchronous DRAM among them.

BRIEF DESCRIPTION OF THE DRAWINGS

The above object and features of the present invention will be more apparent from the following description of the preferred embodiments taken with reference to the accompanying drawings, wherein:

FIGS. 5A to 5E explain a method of setting a mode register set;

FIG. 9 explains a different method of setting the mode register.

DESCRIPTION OF THE PREFERRED EMBODIMENTS

Hereinafter, preferred embodiments of the present invention will be explained, in detail, with reference to the accompanying drawings.

Figure 1:
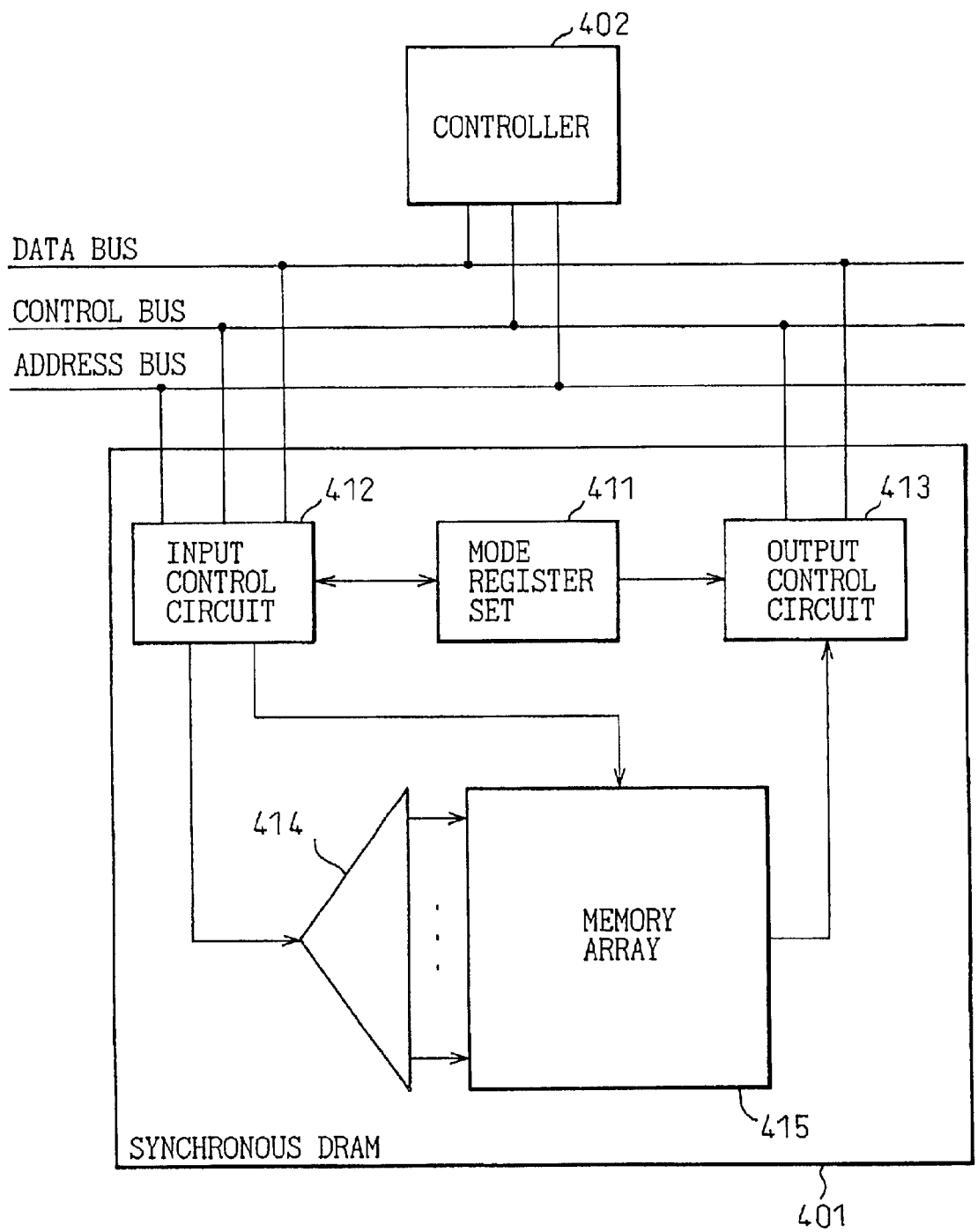
FIG. 1 shows a construction of a memory system utilizing a conventional synchronous DRAM.
Figure 2:
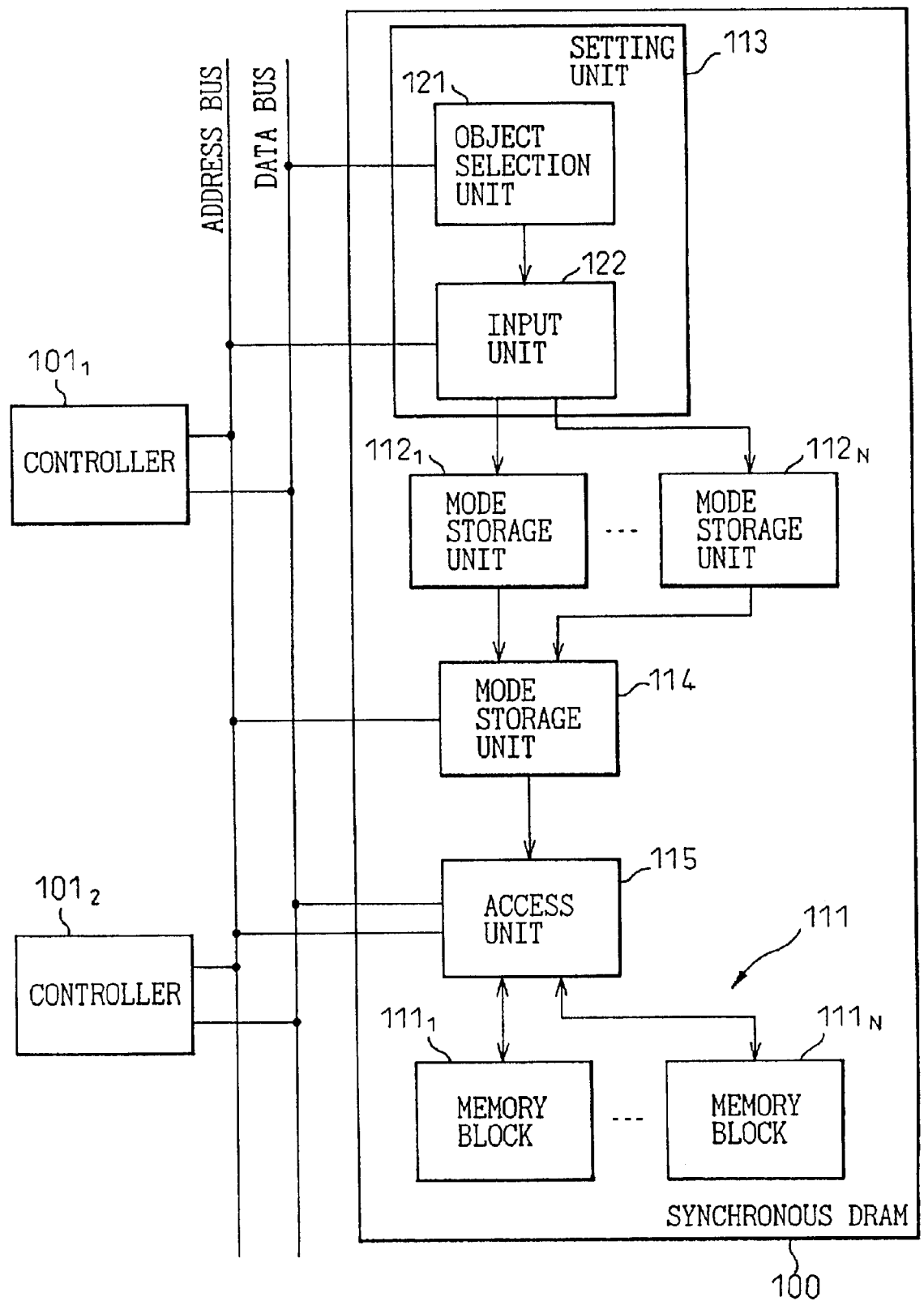
FIG. 2 shows a construction of a memory system utilizing a synchronous DRAM according to the present invention.

Referring initially to FIG. 2, a memory system utilizing a synchronous DRAM according to the present invention will be explained.

A synchronous DRAM 100 is connected to a plurality of controllers $101_1$ and $101_2$ through a bus. The synchronous DRAM 100 has a plurality of mode storage units $112_1$ to $112_N$ corresponding respectively to a plurality of memory blocks $111_1$ to $111_N$ that constitute a memory array 111.

A setting unit 113 sets control information designated by a mode setting instruction to a predetermined mode storage unit 112 in accordance with mode setting instructions outputted from a plurality of controllers $101_1$ to $101_2$, respectively. A mode selection unit 114 selects a suitable mode storage unit $112_1$ to $112_N$ on the basis of an address. An access unit 115 executes an access operation in synchronism with a predetermined clock signal to a corresponding memory block $111_1$ to $111_N$ in accordance with the control information stored in the selected mode storage unit $112_1$ to $112_N$.

According to the memory system shown in FIG. 2, each mode storage unit $112_1$ to $112_N$ corresponding to each memory block $111_1$ to $111_N$ independently stores the control information. When access is made to each memory block $111_1$ to $111_N$, the mode selection unit 114 selectively hands over the control information stored in the corresponding mode storage unit $112_1$ to $112_N$ to the access unit 115.

Consequently, each memory block $111_1$ to $111_N$ is allowed to operate independently in the operation mode represented by the control information stored in the corresponding mode storage unit $112_1$ to $112_N$. This arrangement eliminates the necessity for changing a setting of the mode register set whenever the operation mode is changed, as has been necessary in the prior art, and does not invite the drop of processing performance. In this way, the synchronous DRAM can be used in common among a plurality of controllers 101 requiring the different operation modes.

A detailed construction of the synchronous DRAM 100 will be explained with reference to FIG. 3.

Inside this synchronous DRAM 100, the memory array 211 comprises N memory blocks $211_1$ to $211_N$. Mode register sets $212_1$ to $212_N$ are so disposed as to correspond to these memory blocks $211_1$ to $211_N$, respectively.

Figure 4:
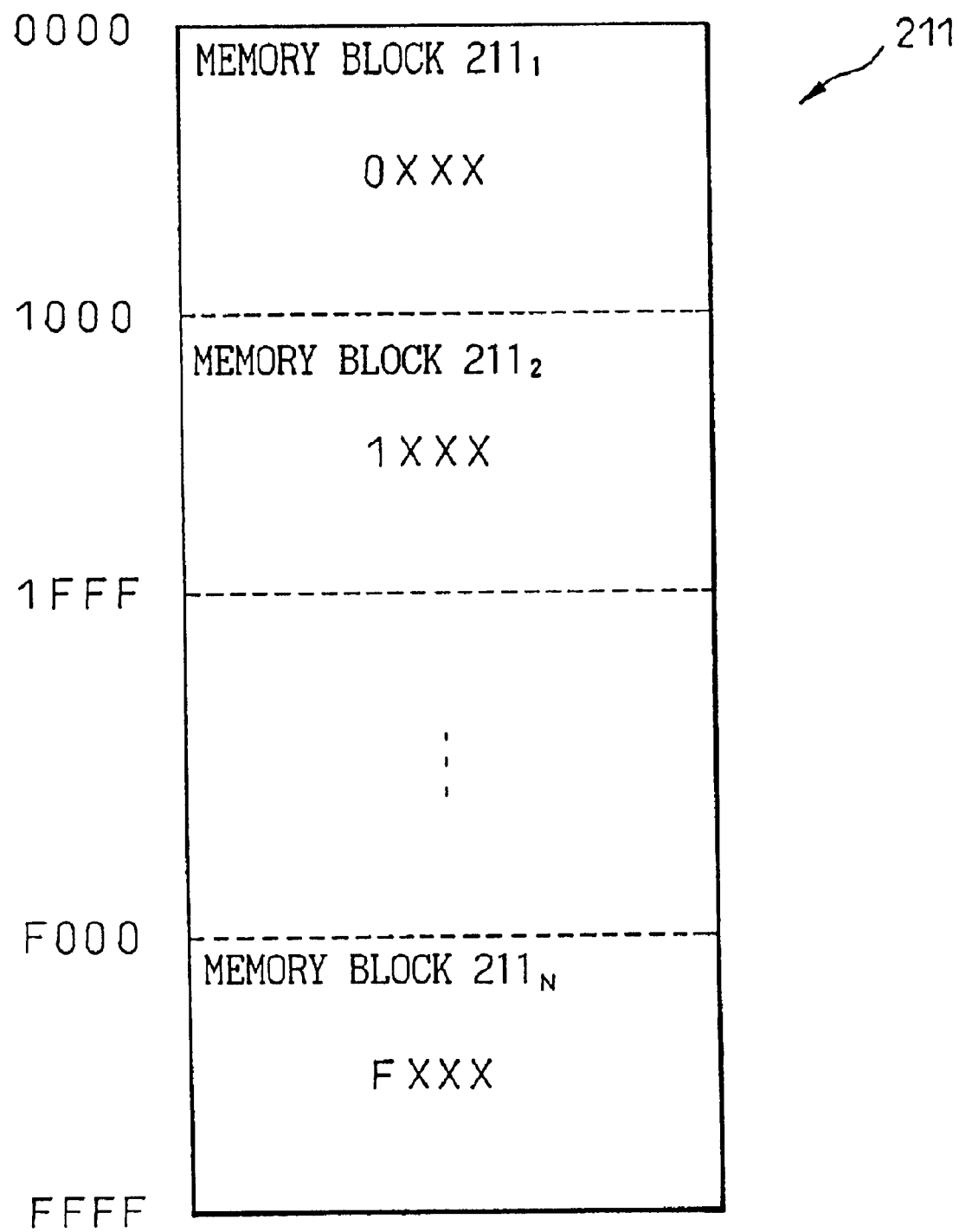
FIG. 4 shows a method of dividing a memory array.
Figure 6A:
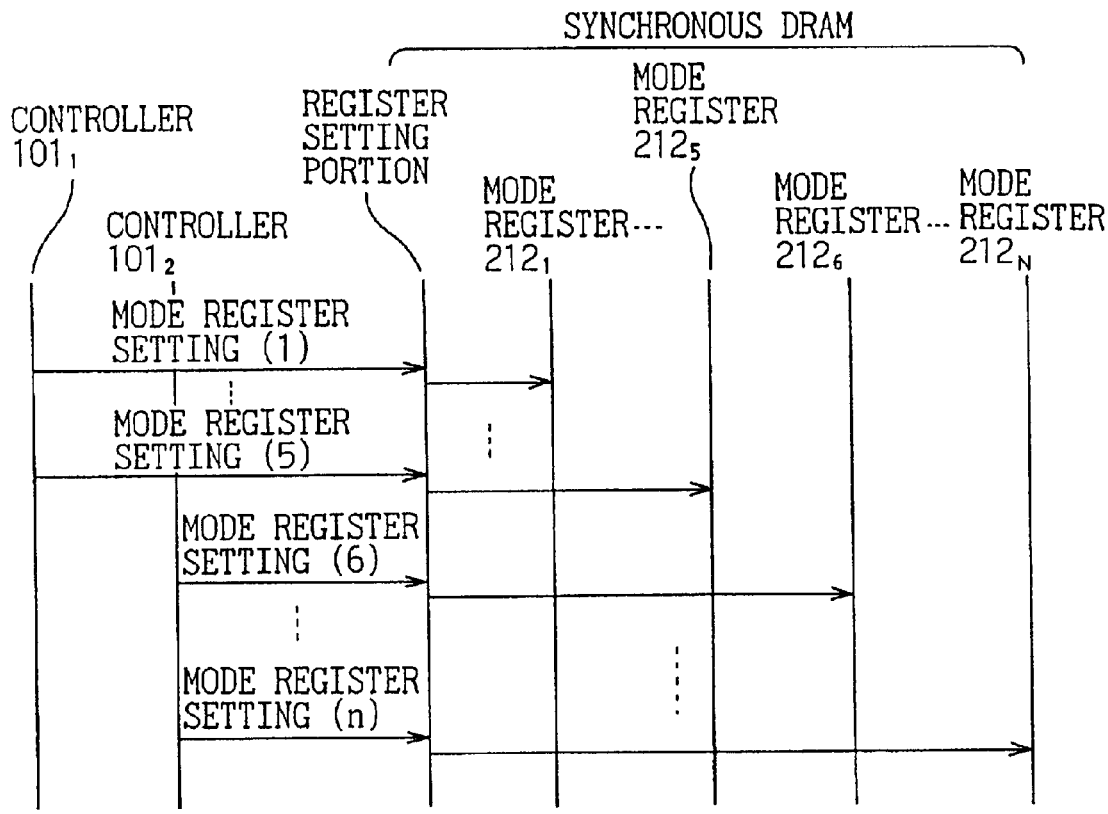
FIGS. 6A and 6B show an access processing for the synchronous DRAM.
Figure 6B:
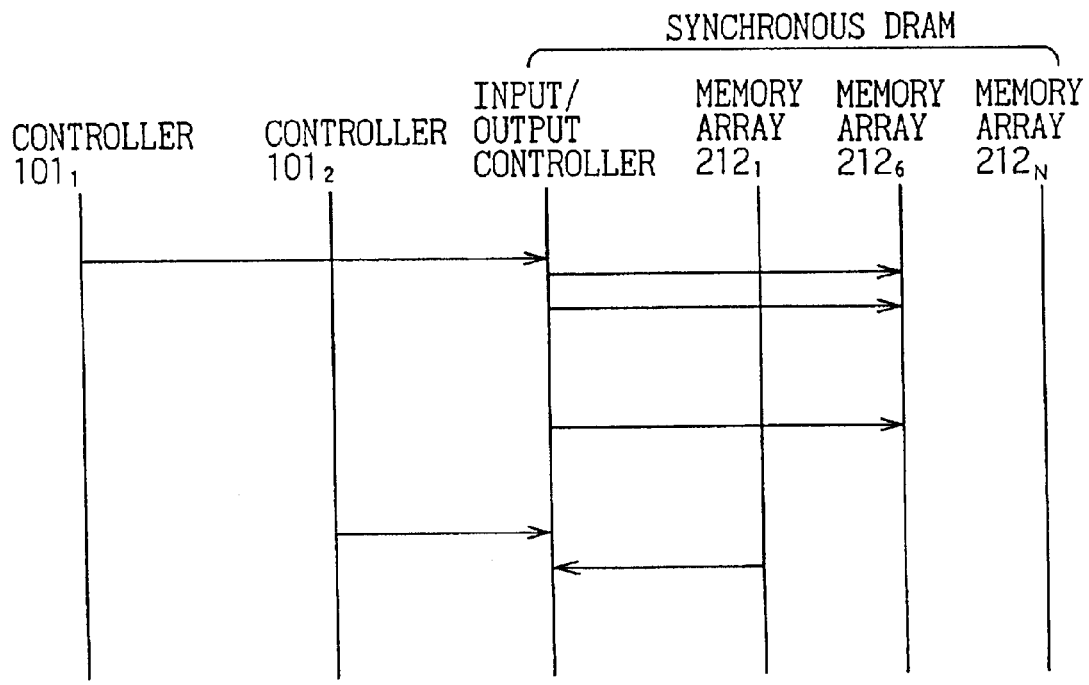

FIG. 4 shows a method of dividing the memory array 211.

The memory array 211 is logically divided into N continuous regions in the address space, giving N memory blocks $211_1$ to $211_N$. Because the memory array 211 inherent to the synchronous DRAM 100 is divided in this way on the basis of the address to form the memory blocks $211_1$ to $211_N$, the address space can be assigned to each controller $101_1$ to $101_2$ in the same way as in the prior art.

Figure 3:
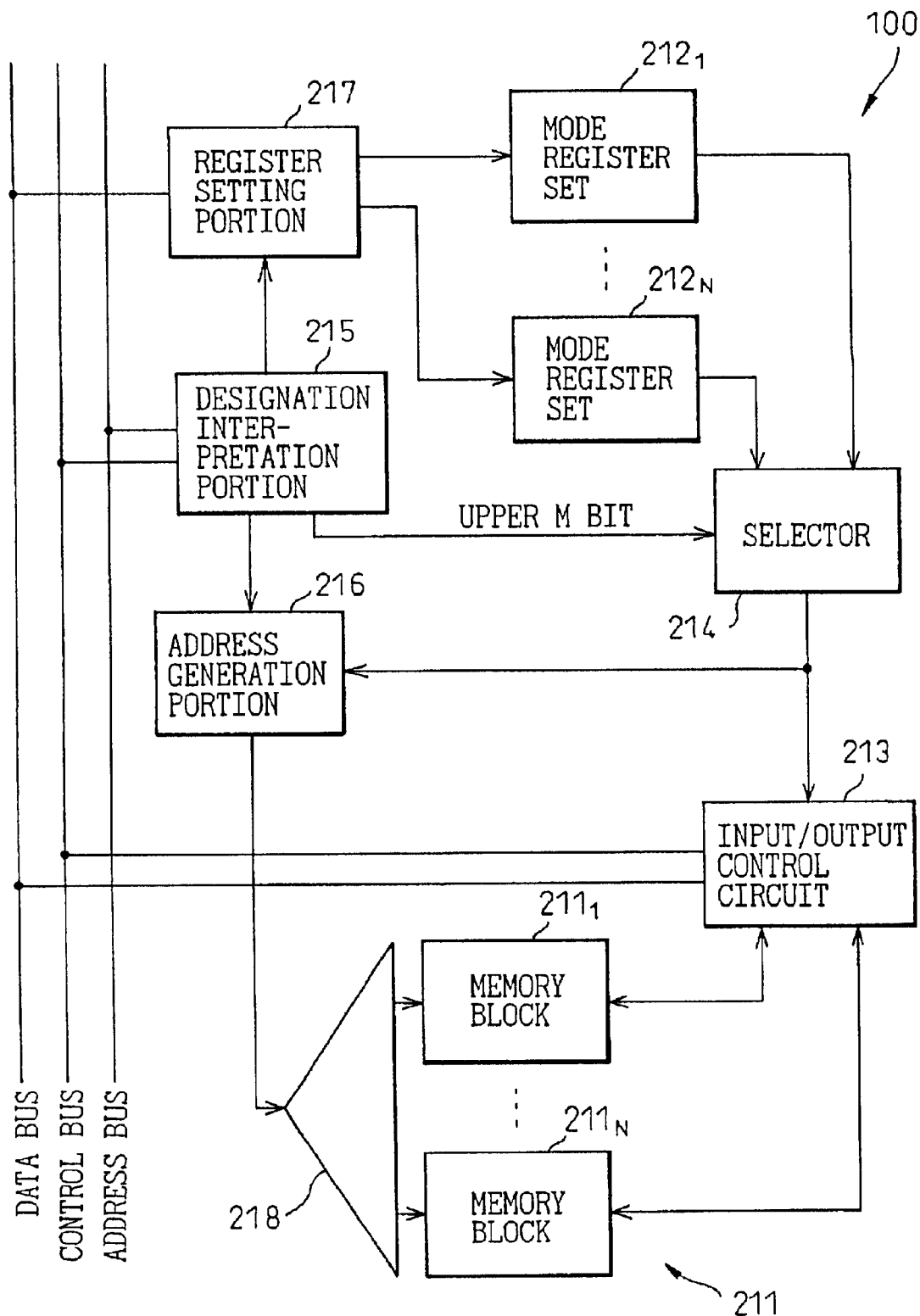
FIG. 3 shows a detailed construction of the synchronous DRAM according to the present invention.

An input/output control circuit 213 and an address decoder 218 shown in FIG. 3 correspond to the access unit 115 shown in FIG. 2. The input/output control circuit 213 is connected to a control bus and to a data bus, and exchanges data between the data bus and the memory array 211 in accordance with a control signal. A selector 214 and an address generation portion 216 shown in FIG. 3 correspond to the mode selection unit 114 shown in FIG. 2. The control data outputted from N mode register sets $212_1$ to $212_N$ are applied to the input/output control circuit 213 and the address generation circuit 216 through the selector 214, and are used for controlling the data input/output operation between the data bus and the memory array 211, and the address generation operation. A designation interpretation portion 215 shown in FIG. 3 corresponds to the input unit shown in FIG. 2. A register setting portion 217 corresponds to an object selection unit 121. The designation interpretation portion 215 discriminates the kind of the instruction from the controllers $101_1$ to $101_2$ (see FIG. 2) on the address and the control signal inputted through the address bus and the control bus, and hands over at least a part of the inputted address to the selector 214 and the register setting portion 217.

Next, the operation of setting the control data to the mode register sets $212_1$ to $212_N$ will be explained.

When a certain controller 101 inputs a specific address that designates setting of the operation mode in succession to the command designating the idle mode at the time of making of power, or the like, the designation interpretation portion 215 hands over the lower order 10 bits of this address to the register setting portion 217.

FIGS. 5A to 5E show a construction of the address that designates setting of the operation mode.

As shown in FIG. 5A, the lower order 10 bits (A0 to A9) of the address are used for setting the mode register set. The bits A0 to A2 are assigned to the burst length, the next bit A3 is assigned to the burst type, the bits A4 to A6 are assigned to CAS latency, the bits A7 and A8 are assigned to the test mode and the bit A9 is assigned to the write bust length. These bits can set the operation mode of the synchronous DRAM when inputted in accordance with the combination of the set values shown in the truth table of FIGS. 5B to 5E.

FIG. 5B represents the bust length and FIG. 5C does CAS latency. FIG. 5D represents the test mode and FIG. 5E does the write burst length and the burst type.

Turning back again to FIG. 3, the lower order M bits of the data outputted from the controller $101_1$, $102_2$ to the data bus are inputted to the register setting portion 217. The register setting portion selects the corresponding one of the mode register sets $212_1$ to $212_N$ on the basis of the bit train.

The register setting portion 217 thereafter sets the control data represented by the lower order 10 bits of the address to the selected mode register set $212_1$ to $212_N$ in the same way as setting of the mode register set in the conventional synchronous DRAM 100.

As described above, the mode register sets $212_1$ to $212_N$ are selected by the lower order M bits of the data outputted by the controller to the data bus, and the selected mode register set $212_1$ to $212_N$ is set on the basis of the control data contained as the lower order 10 bits of the address. In this way, the operation modes can be independently set to the N mode register sets $212_1$ to $212_N$ in accordance with the instruction from the controller.

Incidentally, the number of bits the register setting portion 217 acquires from the data bus may be determined in accordance with the number N of the memory blocks $211_1$ to $211_N$. When, for example, the lower order 8 bits of the data are assigned to designation of the mode register set, the operation modes can be independently set to 256 mode register sets.

It becomes possible in the way described above to set the control data representing the operation mode adaptive to the image data, for example, to the mode register sets $212_6$ to $212_M$ corresponding to the memory blocks $211_1$ to $211_N$.

Next, the data input/output operation to and from each memory block $211_1$ to $211_N$ will be explained.

When the address designating the memory cell inside the memory array 211 of the synchronous DRAM 100 is inputted with the control signal designating the read or write operation, the designation interpretation portion 215 judges the address as the ordinary access instruction. All the addresses so inputted are handed over to the address generation portion 216 to execute the address generation operation.

At this time, the designation interpretation portion 215 inputs the upper order M bits of the address as the information designating the memory blocks $211_1$ to $211_N$ to the selector 214. In response to this information, the selector 214 selects the corresponding mode register set $212_1$ to $212_N$, and the outputted control data is inputted to the address generation portion 216 and to the input/output control circuit 213.

The address generation portion 216 generates a series of addresses in accordance with the inputted operation mode and inputs them to the memory blocks $211_1$ to $211_N$ through the address decoder 218. The input/output control circuit 213 executes the access processing corresponding to the operation mode to the memory cells designated to the address input thus generated.

For example, when the address designating the memory cell contained in the memory block $211_6$ is inputted, the designation interpretation portion 215 hands over the address to the selector 214. The selector 214 selects the control data for the image data, stored in the mode register set $212_6$ corresponding to the memory cell block $211_6$, in accordance with a part of the address, and inputs this control data to the address generation portion 216 and to the input/output control circuit 213. The address generation circuit 216 and the input/output control circuit 213 operate in the operation mode suitable for the image data in response to the input of this control data. In this way, the image data can be written continuously to a series of memory cells inclusive of the memory cell designated by the address and a series of image data so written can be read out continuously irrespective of the kind of the data stored in other memory arrays $211_1$ to $211_5$ and $211_7$ to $211_N$.

Similarly, when the memory cell contained in the memory cell block $211_1$ is designated, the address generation portion 216 and the input/output control circuit 213 operate in response to the input of the address and in accordance with the control data for the program, stored in the mode register set $212_1$. Therefore, the program data can be written to the memory cell designated by the address, and the program data so written can be read out irrespective of the kind of the data stored in other memory arrays $211_2$ to $211_N$.

As described above, the synchronous DRAM 100 of the present invention shown in FIG. 3 includes a plurality of memory blocks $211_1$ to $211_N$ and the mode register sets $211_1$ to $211_N$ corresponding to them, respectively, and can use the control data stored in the corresponding mode register sets $212_1$ to $212_N$ when access is made to each memory block $211_1$ to $211_N$. This construction makes it possible to apply mutually different operation modes when access is made to each of the memory blocks $211_1$ to $211_N$ that are separate as hardware, and to handle each memory block $211_1$ to $211_N$ as a logically independent memory block $211_1$ to $211_N$.

At the time of turning on power, etc, each controller $101_1$ to $101_2$ generates the mode register selection instruction for the mode register set $212_1$ to $212_N$ and sets the control data representing the operation mode suitable for each mode register set $212_1$ to $212_N$ to each of them (1) to (N). Accordingly, access can be made to the memory cell contained in the corresponding memory block $211_1$ to $211_N$ in accordance with the operation mode corresponding to the memory block $211_1$ to $211_N$ irrespective of the operation mode adapted to the access immediately before.

For example, the controller 101 first gains access for writing the image data. Then, a series of data are written into the memory array $211_6$ assigned as the array for the image data in accordance with the operation mode for the image data. When the controller $101_2$ then gains access for reading the program, the corresponding data are read out from the memory array $211_1$ storing the program data in accordance with the operation mode for the program.

Here, each operation mode is set and applied for each memory block $211_1$ to $211_N$. Therefore, when the synchronous DRAM is shared by a plurality of controllers $101_1$ to $101_2$, the setting process of the operation mode due to the alteration of the controllers $101_1$ to $101_2$ can be eliminated. Also, a single synchronous DRAM 100 can be shared by a plurality of controllers $101_1$ to $101_2$ while its features are fully exploited.

Because the single synchronous DRAM 100 can be shared by a plurality of controllers $101_1$ to $101_2$ in this way, the sizes of various hardware devices can be reduced. For example, it is possible to constitute a construction in which the image data is stored in a part of the memory array 211 provided to this synchronous DRAM 100 and the control program, in another part, and the graphic processor and the control processor share the synchronous DRAM. Since the memory chip for the control program need not be mounted separately in this case, the size of the apparatus can be reduced while maintaining graphic performance.

A part of the data outputted to the data bus is inputted to the register setting portion 217 and is used for designating the mode register set 212. Therefore, the memory array 211 of the synchronous DRAM 100 can be freely divided to provide a desired number of memory blocks $211_1$ to $211_N$. Therefore, the necessary capacity can be assigned to a large number of controllers $101_1$ to $101_2$, and the memory capacity of the synchronous DRAM 100 can be fully utilized.

On the other hand, the memory blocks $211_1$ to $211_N$ can be brought into conformity with the memory bank the memory array 211 has. As a feature from the hardware aspect, the synchronous FRAM 100 is divided into a plurality of memory banks as a unit of the refresh operation. When these memory banks are assigned to a plurality of controllers $101_1$ to $101_2$, respectively, the synchronous DRAM 100 can be shared, too. In this case, the occurrence of an interrupt by the refresh operation during the access operation to each memory array 111 can be avoided.

The method of dividing the memory array 211 in accordance with the banks will be explained with reference to FIGS. 7 and 8.

Figure 7:
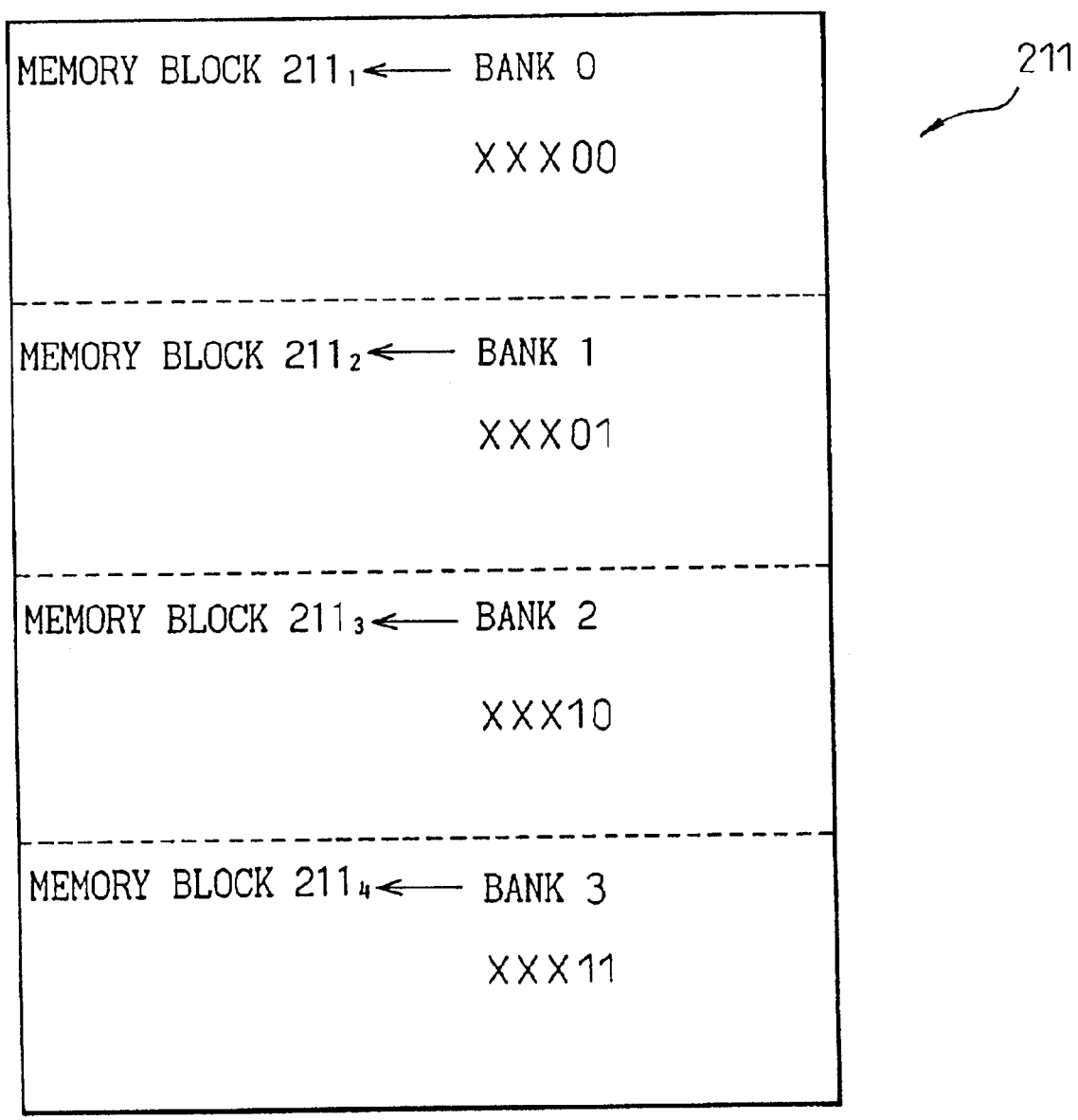
FIG. 7 shows a method of dividing a memory array in accordance with banks.
Figure 8:
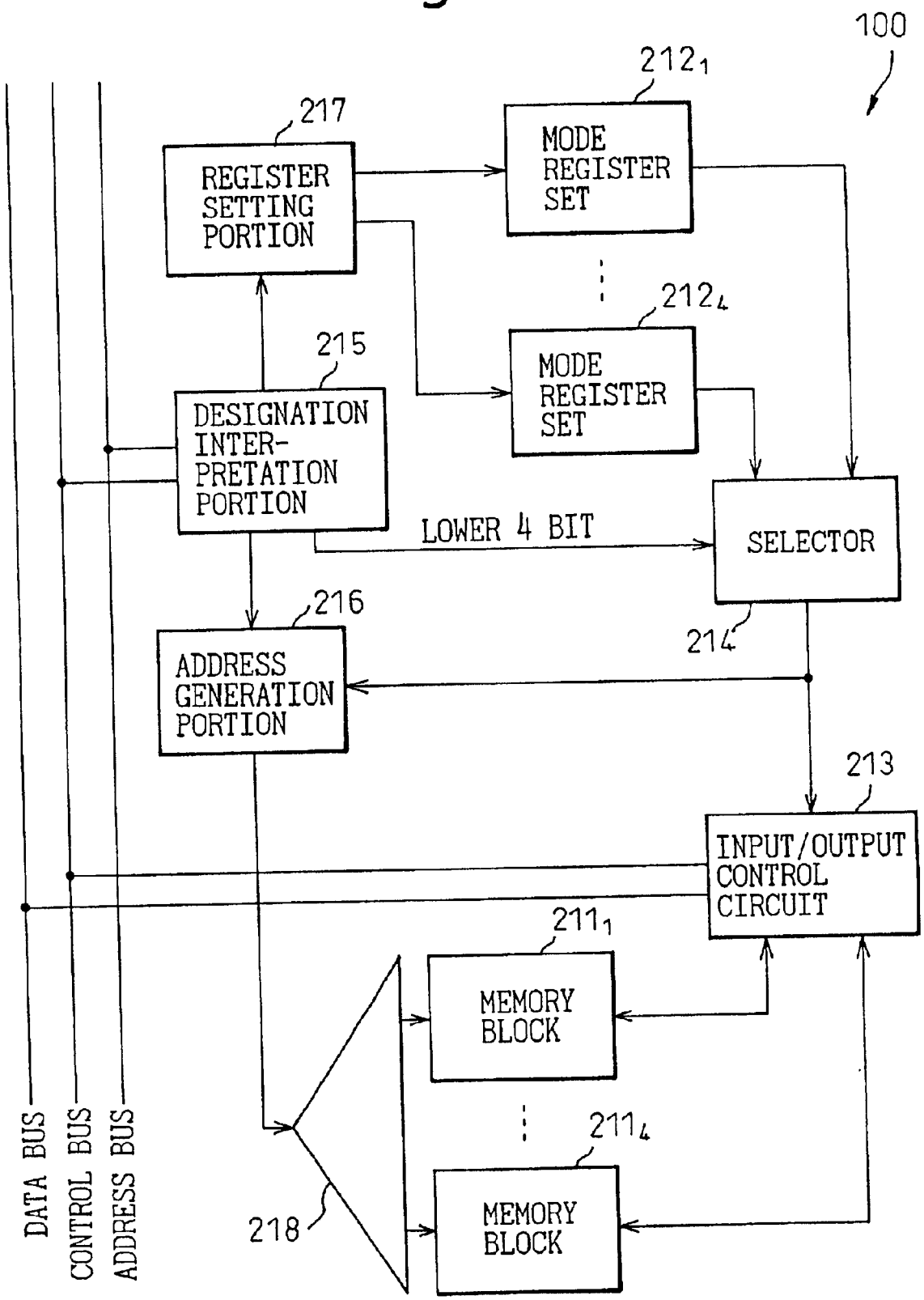
FIG. 8 shows a synchronous DRAM according to another embodiment of the present invention.

FIG. 7 shows an example where the memory array 211 comprises four banks 0, 1, 2 and 3, and each of these banks 0 to 3 is utilized as a memory block $211_1$ to $211_4$. In this case, the construction shown in FIG. 8 is employed for the synchronous DRAM 100.

Only the difference of the construction shown in FIG. 8 from that of FIG. 3 will be explained. The designation interpretation portion 215 hands over the lower order 2 bits received through the address bus to the selector 214. The designation interpretation portion 215 uses these 2 bits for selecting the mode register set 212.

Each bank constituting the synchronous DRAM 100 originally has a construction that is independent hardware-wise. Therefore, the change of the hardware necessary for allowing each memory bank $211_1$ to $211_4$ to operate independently can be limited to minimum. When each memory bank is assigned to each controller $101_1$ to $101_2$, the occurrence of the interrupt processing due to the refresh operation during the access can be avoided.

When the number of memory blocks $211_1$ to $211_4$ formed by dividing the memory array 211 of the synchronous DRAM 100 in this way is small, a spare bit combination in the truth table shown in FIGS. 5B to 5D is utilized to designate the mode register sets $212_1$ to $212_N$ for setting the control data.

Next, another example of the setting method of the operation mode in the synchronous DRAM according to the present invention will be explained.

In the foregoing examples, the lower M bits of the data outputted from the controller 101 to the data bus are inputted to the register setting portion 217, and the register setting portion 217 selects the corresponding mode register set from among N mode register sets $212_1$ to $212_N$ on the basis of this bit train. Alternatively, it is also possible to employ the construction wherein the register setting portion selects the corresponding mode register set $212_1$ to $212_N$ on the basis of the bit train of a part of the address outputted to the address bus. For example, the bit train for selecting the mode register sets $212_1$ to $212_N$ may be set in succession to the bit train A0 to A9 of the address shown in FIG. 5A.

The control data can be set by the test mode A7, A8 in the address as shown in FIG. 9. In this case, as represented in (1) to (4) in the table shown in FIG. 9, the combination of the bit 8 with the bit 7 of the address assigned to the test mode designates the mode register set $212_1$ to $212_4$ for setting the control data.

Furthermore, the 3 bits (A4 to A6) assigned to CAS latency or the 3 bits (A0 to A2) assigned to the burst length can be used to designate the mode register sets $212_1$ to $212_4$.

As explained above, the memory array 211 provided to the single synchronous DRAM 100 is divided into a plurality of memory blocks $211_1$ to $211_4$, the control data is independently set to each memory block $211_1$ to $211_4$ and the control data is then applied with the result that each memory block $211_1$ to $211_4$ can be handled as the independent memory. Therefore, it becomes possible to materialize a memory system sharing the synchronous DRAM 100 by using a plurality of controllers $101_1$ to $101_2$ while exploiting the features of the synchronous DRAM 100.

Accordingly, the memory capacity that becomes excessive due to the increase of the capacity of the synchronous DRAM can be utilized as the region for storing the program data, and the like, and another memory chip that has been necessary in the past for storing the program data need not be mounted separately. For this reason, the graphic board, or the like, can be further miniaturized.

What is claimed is:

1. A synchronous DRAM comprising:
   one memory array divided into a plurality of logical memory blocks;
   a plurality of mode storage units disposed to correspond to each of said logical memory blocks respectively, for storing control information for defining operation modes of said logical memory blocks;
   a setting unit for setting the control information designated by a mode setting instruction outputted from a plurality of controllers to one of said mode storage units designated by said mode setting instruction;
   a mode selection unit for selecting said mode storage unit corresponding to said logical memory block containing a memory cell designated by an address inputted from one of said controllers; and
   an access unit for executing an access operation in synchronism with a predetermined clock signal for the corresponding one of said logical memory blocks in accordance with the control information stored in said mode storage unit selected.

2. A synchronous DRAM according to claim 1, wherein said plurality of logical memory blocks is constituted by continuous memory cells designated by addresses.

3. A synchronous DRAM according to claim 1, wherein said plurality of logical memory blocks coincides with memory banks.

4. A synchronous DRAM according to claim 1, wherein said setting unit includes an object selection unit for selecting said mode storage unit corresponding to a bit train on the basis of said bit train in the data outputted as a part of said mode setting instruction from a plurality of controllers, and setting it as a setting object of the control information.

5. A synchronous DRAM according to claim 4, wherein said bit train is a bit train contained in the address outputted to an address bus.

6. A synchronous DRAM according to claim 5, wherein said bit train contained in said address is a bit train assigned to a test mode.

7. A synchronous DRAM according to claim 5, wherein said bit train contained in said address is a bit train assigned to a burst length.

8. A synchronous DRAM according to claim 5, wherein said bit train contained in said address is a bit train assigned to CAS latency.

9. A synchronous DRAM according to claim 4, wherein said bit train is a bit train contained in the data outputted to said data bus.

10. A synchronous DRAM according to claim 4, wherein said setting unit includes an input unit for inputting the control information to said mode storage unit as a setting object on the basis of the bit train outputted as a part of the mode setting instruction by said plurality of controllers to said address bus.

11. A synchronous DRAM according to claim 1, wherein said mode selection unit includes:

a selector for acquiring information designating said logical memory blocks and selecting the control data outputted from the corresponding one of said mode register sets; and an address generation unit for generating a series of addresses in accordance with the operation mode inputted.

12. A synchronous DRAM according to claim 1, wherein said access unit includes:

an address decoder for decoding an address input and designating the memory cell; and an input/output control circuit for executing an access processing corresponding to the operation mode designated, for the designated memory cell.

* * * * *